United States Patent [19]

Chang et al.

[11] Patent Number: 5,777,578
[45] Date of Patent: Jul. 7, 1998

[54] GLOBAL POSITIONING SYSTEM (GPS) COMPASS

[75] Inventors: Fan-Ren Chang; Li-Sheng Wang; Chi-Hsuan Tu; Yen-Weay Shei; Kun-Yuan Tu, all of Taipei; Ching-Di Chang, Yung Kung, all of Taiwan

[73] Assignee: National Science Council, Taipei, Taiwan

[21] Appl. No.: 796,479

[22] Filed: Feb. 10, 1997

[51] Int. Cl.⁶ .................................................. G01S 5/02
[52] U.S. Cl. .................................. 342/357; 701/215
[58] Field of Search ........................... 342/357, 156, 342/424, 442; 701/215

[56] References Cited

U.S. PATENT DOCUMENTS

| | | | |
|---|---|---|---|
| 5,430,654 | 7/1995 | Kyrtsos et al. | 364/449 |
| 5,491,636 | 2/1996 | Robertson et al. | 364/432 |
| 5,506,588 | 4/1996 | Diefes et al. | 342/357 |

*Primary Examiner*—Thomas H. Tarcza
*Assistant Examiner*—Dao L. Phan
*Attorney, Agent, or Firm*—Beveridge, DeGrandi, Weilacher & Young, L.L.P.

[57] ABSTRACT

The global positioning system (GPS) compass is consisted of three main units. These units are the pointer, the sensor, and the controller. The pointer unit is comprised of an iron frame, an aluminum bar, and two aluminum plates. The sensor unit is comprised of global positioning system (GPS) receivers and global positioning system (GPS) antennas. The controller unit includes a personal computer, a stepping motor, several data interface circuit boards, and some motor control circuit boards. The baseline of the pointer is an aluminum bar of about one meter long. The sensor unit can measure the baseline's azimuth angle relative to the local coordinate. When command is received, the controller unit is capable of turning the aluminum bar to the desired direction by the aid of the stepping motor. There are two modes for operation available. One is the initial mode, the other is the normal mode. It takes about one or two minutes to complete the initial mode operation. In this mode, adjustment values needed in the algorithm for normal mode can be obtained upon rotating the aluminum bar at the baseline. The purpose of the initial mode is similar to an instrument calibration. In the normal mode, the global positioning system (GPS) compass can point itself to the desired direction in real time operation. In this invention, the combined use of attitude determination algorithm and stepping motor controlling technique, results in pointing deviation from accuracy to be less than 1 degree.

5 Claims, 7 Drawing Sheets

$$\triangle \rho_i = A^T G_i = |A| \cos \theta_i$$

GLOBAL POSITIONING SYSTEM (GPS) COMPASS

BACKGROUND

Various methodologies, such as the principle of light, laser or infrared, mechanical design, filtering and signal process, etc., have been used in most past or current navigation systems. For instance, in the R.O.C. patent number 74103927, a navigation system is designed for unmanned automotive vehicles. In this patent, the system utilized a light bundle to guide moving vehicles to reach the destination. R.O.C. patent number 75201187 revealed a turning controller which was capable of showing the direction of turning, in which a directional antenna is utilized to guide an moving object rotating in a free space. In R.O.C. patent 75211737, it revealed a navigation system of toys. In this patent, it utilized infrared to point the direction of moving. In R.O.C. patent 76207340, it revealed a navigation system for automobiles. In this patent, a pre-programmed computer is used to detect the distance of the movement of the automobile and the positions are then calculated based on a data base of map. In R.O.C. patent 76103209, a rotation control device is revealed. In this patent, the method of addition is adopted to obtain output signals to control the rotation of a motor. In R.O.C. patent 77103729, a control algorithm of unmanned vehicle is envisioned. In this algorithm, the commands to control the movement is obtained in accordance to the capability of automobiles. On the contrary, the present invention is to utilize the signals transmitted from the global positioning system (GPS) satellites to acquire the current direction, and then issues commands to the motor to have the pointer point to the desired direction. In recent years, the global positioning system(GPS) has received substantial attention in navigation due to its unique features of no limitation on time, place, and number of users. Traditional heading indicators used in navigation systems include magnetic compasses, gyroscopes, etc. The magnetic compass can provide the direction of magnetic north, with accuracy being affected by the magnetic field intensity nearby the equipment. Typical magnetic compasses readings have 5° errors. To keep the magnetic compass away from the iron ore (underground), iron material, electrical machines, etc., is very difficult in general. On the other hand, the gyroscopes, such as mechanical gyro, ring laser gyro, or fiber optics gyro, are sometimes used for fine attitude determination. However, gyroscopes are suffered from the error drift. The measurement errors increase along with the time duration. Comparing to the above two devices, the present invention can point to any desired direction without the above-mentioned shortcomings. It synthesizes the state-of-the-art technologies and requires professional knowledges to devise.

DETAILED DESCRIPTION

Summary of the Invention

The present invention, the global positioning system compass, utilizes the carrier phases of satellite signals obtained from the global positioning system, to determine the attitude vector of the one meter long baseline vector. Together with the stepping motor controlling techniques, a new pointing device becomes available for the substitution of traditional compasses and gyroscopes.

BRIEF DESCRIPTION OF THE DRAWINGS

The file of this patent contains at least one drawing (photograph) executed in color. Copies of this patent with color drawings will be provided by the Patent and Trademark Office upon request and payment of the necessary fee.

Reference Number of the Attached Drawings 1. the pointer unit
   11. iron frame
   12. aluminum bar
   13. aluminum plates
2. the sensor unit
   21. global positioning system antennas
   22. global positioning system receivers
3. the controller unit
   31. personal computer
   32. data interface circuit boards
   33. stepping motor
   34. motor controller circuit boards

DESCRIPTION OF THE PREFERRED EMBODIMENTS

The purpose of the present invention is to provide a novel compass device without limitation of time, place, and weather. The pointing accuracy is within one degree.

The present invention combines the attitude determination algorithm which utilizes the global positioning system and the stepping motor controlling technique to perform its functions. Since the algorithm requires receiving signals transmitted from the global positioning system satellites, obstacles in space are prohibited. For this reason, in an open area, such as dessert, ocean, and air, the global positioning system compass has the best performance. On the other hands, open areas are the places where the compass is indispensable. Any movements, no matter for people or for vehicles, require good direction indicators to know the right direction. The present invention, ie. the GPS compass is most suitably used in such open areas.

The present invention, the global positioning system compass, is comprised of a pointer unit, a sensor unit, and a controller unit. The pointer unit consists of a supporting frame, a metal bar, and two metal plates. The sensor unit consists of global positioning system antennas and global positioning system's signal receivers. The controller unit consists of a personal computer, several data interface circuit boards, a stepping motor, and several motor controller circuit boards.

Figure 1:
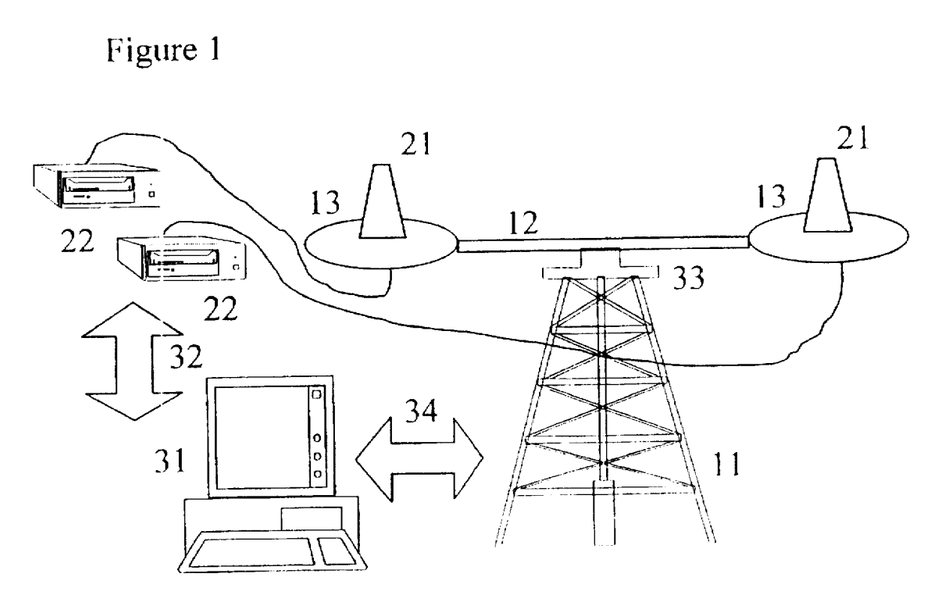
FIG. 1 is a configuration of the global positioning system compass

The hardware configuration of the present invention is shown in FIG. 1. The pointer unit includes a supporting frame (11), a metal bar (12), and two metal plates (13). The sensor unit (2) includes two global positioning system antennas (21) and the corresponding global positioning system receivers (22). The controller unit includes a personal computer (31), some data interface circuit boards (32), a stepping motor (33), and several motor controlling circuit boards (34). The supporting frame can be an iron frame or any metal frame. The metal bar can be any metal, or can be replaced by any non-metal stiff material. The metal plates can be aluminum plates or copper plates. The length of the aluminum bar is about one meter, which is the baseline. The system can measure azimuth angle of the baseline relative to the local coordinate.

Figure 2:
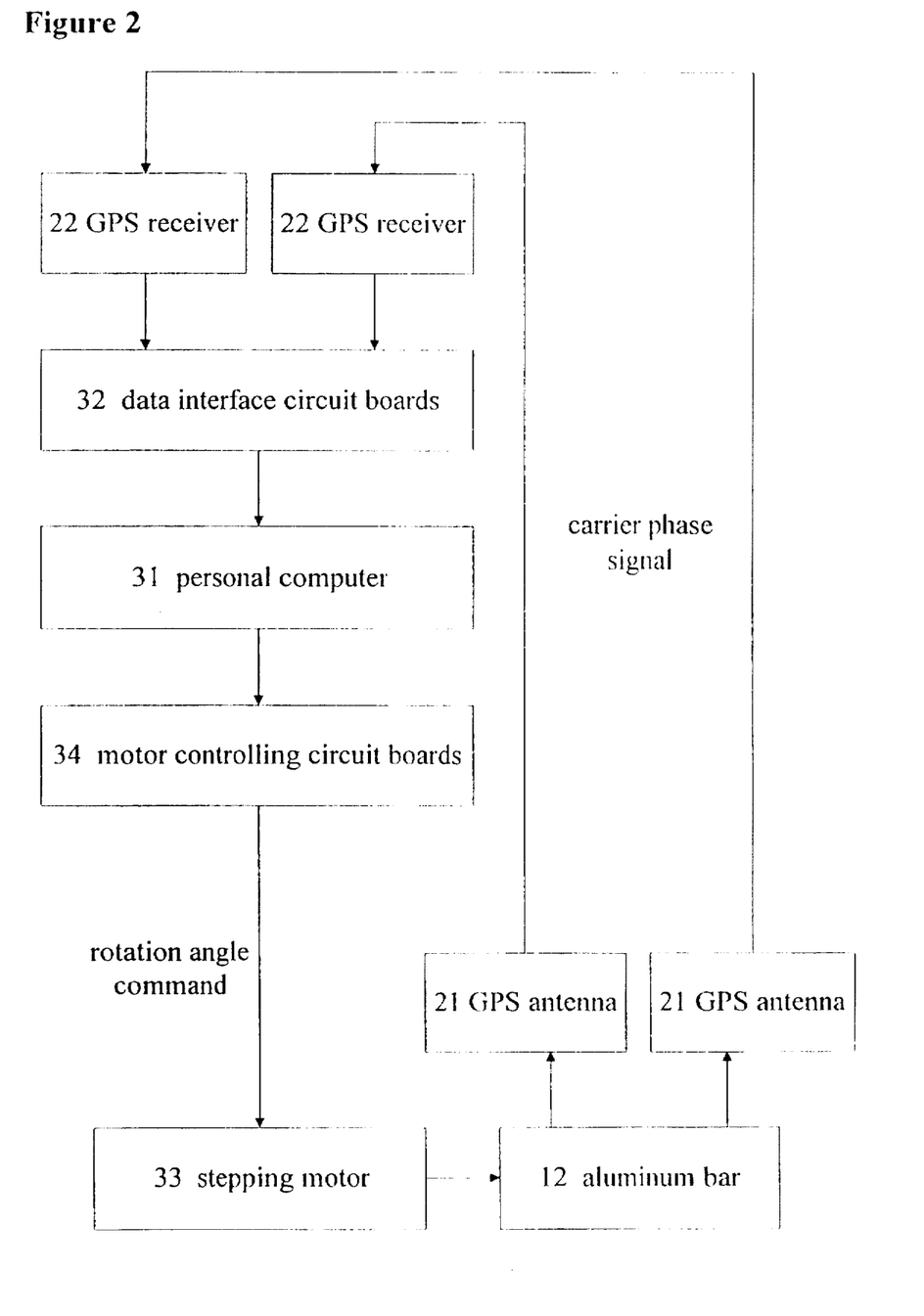
FIG. 2 is a principle of the global positioning system compass

The principle of the global positioning system compass can be explained as follows: a stepping motor (33) is installed at the top of the supporting frame (11), and the metal bar (12) is fixed to the rotor of the motor (33). Two metal plates (13), where global positioning system antennas are installed, that are attached at both ends of the metal bar (12). The function of metal plates (13) is to minimize multipath effects of satellite signals. Antennas (21) are used for receiving signals from global positioning system satellites. The global positioning system receivers (22) are for the process of signals to obtain the ephemeris data and the carrier phases. These data are sent to the personal computer (31) via data interface circuit boards (32). The software in the computer then calculates the attitudes and directions, so the azimuth angle of the baseline relative to the local coordinate can be obtained. The software then sends commands to the stepping motor (33) to rotate the pointer to desired direction, via the motor controlling circuit boards (34), based on the data calculated by the computer software. These actions are explained in FIG. 2.

Figure 3:
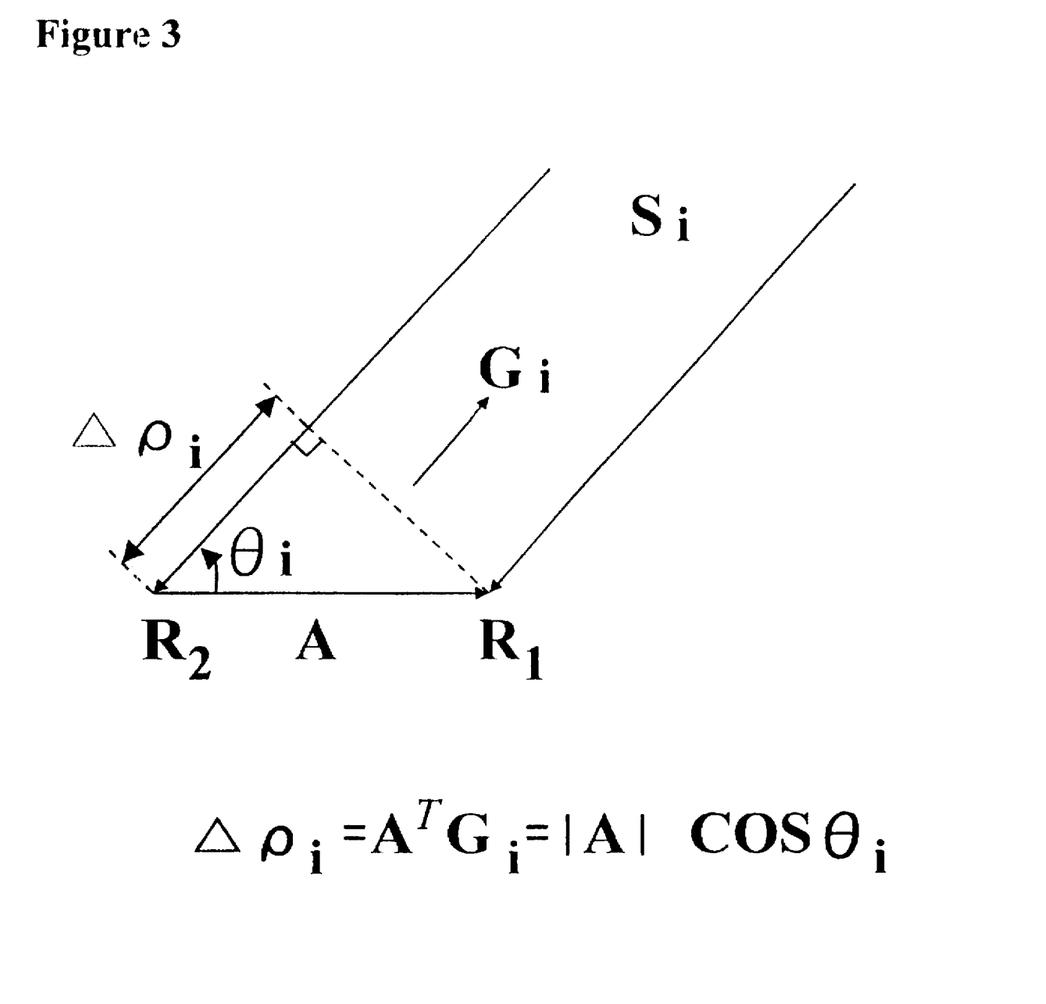
FIG. 3 is a diagram showing the determination of the attitude vectors from the carrier phases.

Based on the data obtained from the global positioning system receivers, the azimuth angle of the baseline can be calculated from the difference between carrier phases, as illustrated in the principle of interferometry. The principle is explained as follows: suppose $R_1$ and $R_2$ represent positions of the two global positioning system antennas, and the distance between them is about one meter. The attitude vector A directed from $R_2$ to $R_1$ is to be determined. Let $S_i$ represent the i th satellite of the global positioning system. Since the altitude of the satellite is about 20,000 km, the unit of vector from $R_1$ to $S_i$, $G_i$, is almost the same as the unit vector from $R_2$ to $S_i$. The carriers received by both receivers from the satellite can be also assumed to be parallel. Let $\theta_i$ denote the angle between $G_i$ and A, then from FIG. 3, $\Delta\rho_i = |A|\cos\theta_i$, where $\Delta\rho_i$ refers to the difference between the distances from satellite $S_i$ to $R_1$ and $R_2$, respectively. The wavelength of the carrier is 19.03 centimeter. If the distance from the satellite $S_i$ to receivers $R_1$, $R_2$ can be measured by counting the numbers of carrier phases, the accuracy of $\Delta\rho_i$ can be better, which yields more accurate angle measurement $\theta_1$. If there are no clock biases associated with the receivers, the carrier phase differences from 3 satellites can be used to solve for the attitude vector A. However, due to the inevitability of clock biases, the carrier phase signals from 4 satellites are necessary.

The above principle of interferometry has three difficulties needed to be solved in realtime applications. (1) The clocks on the receivers are not synchronized. (2) The ambiguity of carrier phases and phenomena such as the cycle slip of carrier signals often result in inaccurate integer value of $\Delta\rho_i$. (3) The phase center of the antennas may be inaccurate, due to the occurrence of multiple paths of satellite signals, or other uncertain factors. As stated in (2), the integer value of carrier phase for $\Delta\rho_i$ may not be accurate, but the decimal point can be determined by using the phase-locked loop in the receivers.

To solve the above problems, the software employed in the present invention adopts (A) the method of double difference, in order to eliminate unsynchronized problem between two receivers (as stated in item (1) in previous paragraph). However, receiving signals from four satellites are required. (B) Baseline rotation method, in order to eliminate the problems of integer ambiguity of carrier phases (as stated in item (2) in previous paragraph), and the inaccuracy of the antenna phase center (as stated in item (3) in previous paragraph).

Figure 4:
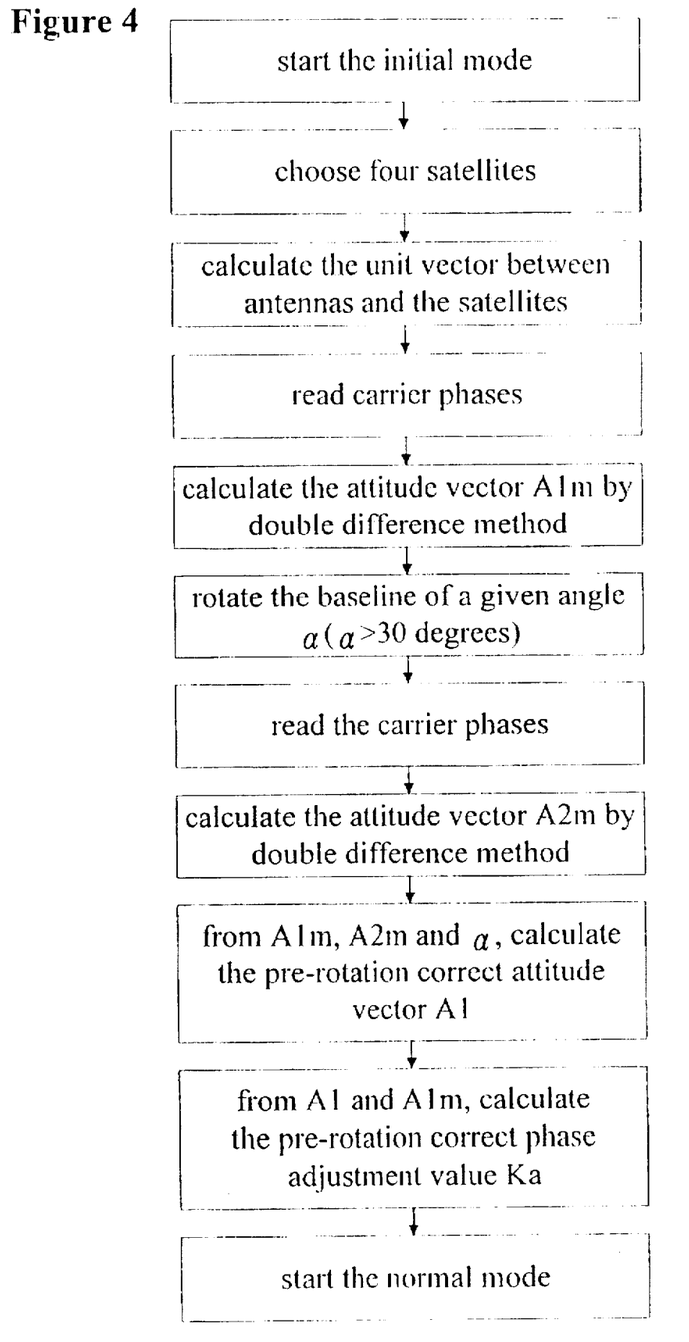
FIG. 4 is a flow chart of the initial mode.
Figure 5:
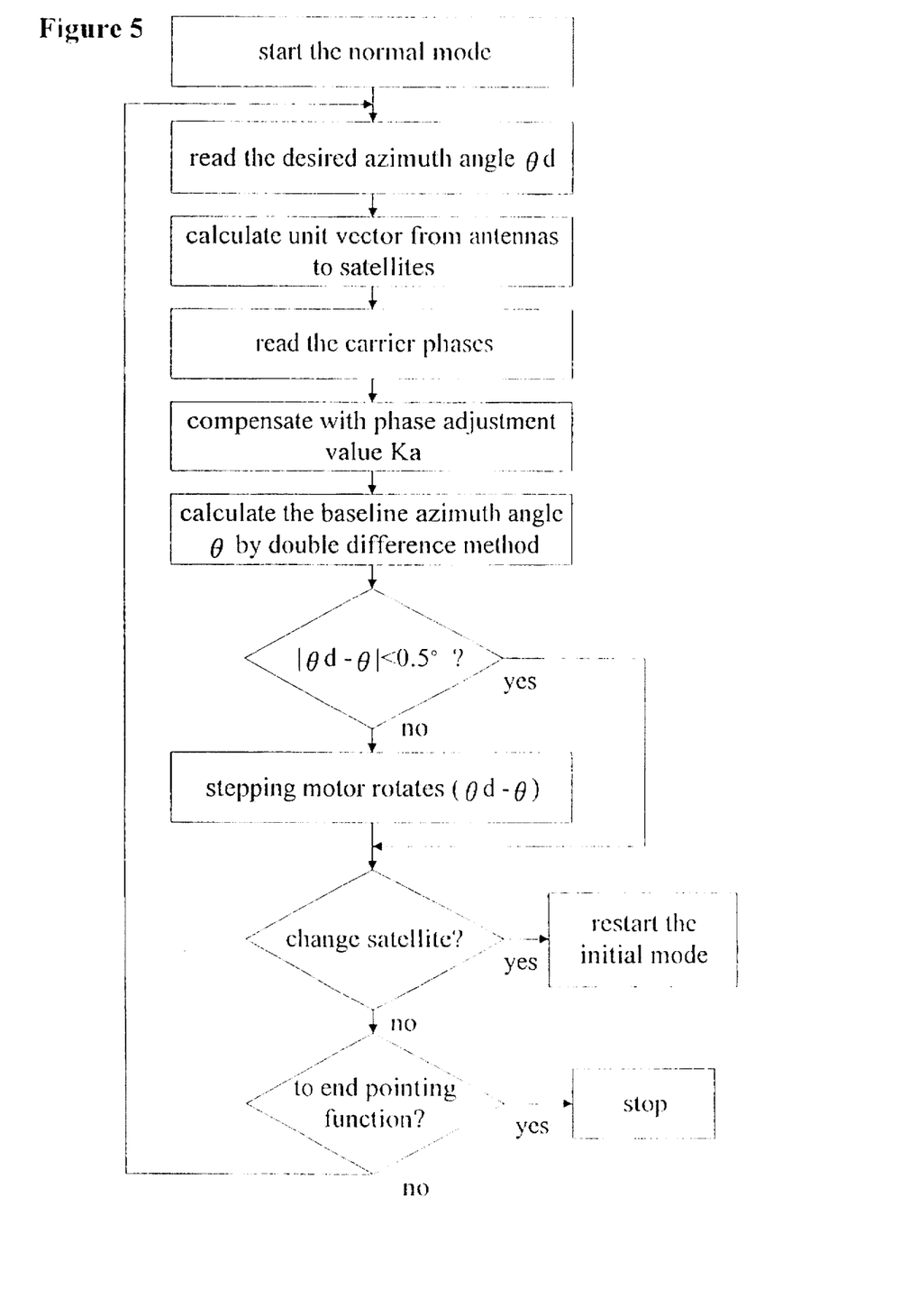
FIG. 5 is a flow chart of the normal mode.

The present invention, the global positioning system compass, operates in two modes. One is the initial mode, the other is the normal mode. The method of double difference is used in both modes. The initial mode functions similar to the calibration of the instrument. Basically, it is to compute the adjustment value for the carrier phases by using the method of baseline rotation. In the normal mode, the adjustment value is used for eliminating the integer ambiguity and the biases for the carrier phases. With the computed correct attitude vector, the motor is instructed to turn the pointer to the desired direction. It takes one or two minutes for the initial mode to complete. The normal mode operates in real-time. The flow charts of the initial mode and normal mode are illustrated in FIG. 4 and 5, respectively.

The present invention, the global positioning system compass, includes the following key components: two global positioning system receivers, a personal computer, and a stepping motor. The global positioning system receivers adopt two sets of Magnavox model MX4200, and the stepping motor adopts Intellimotor Series model 32B.

There are two types of peripheral circuit boards for the personal computer. One is data interface circuit board, and the other is stepping motor controlling circuit board. They are used for the connections from the computers to the global positioning receivers and the stepping motor, respectively.

Figure 6:
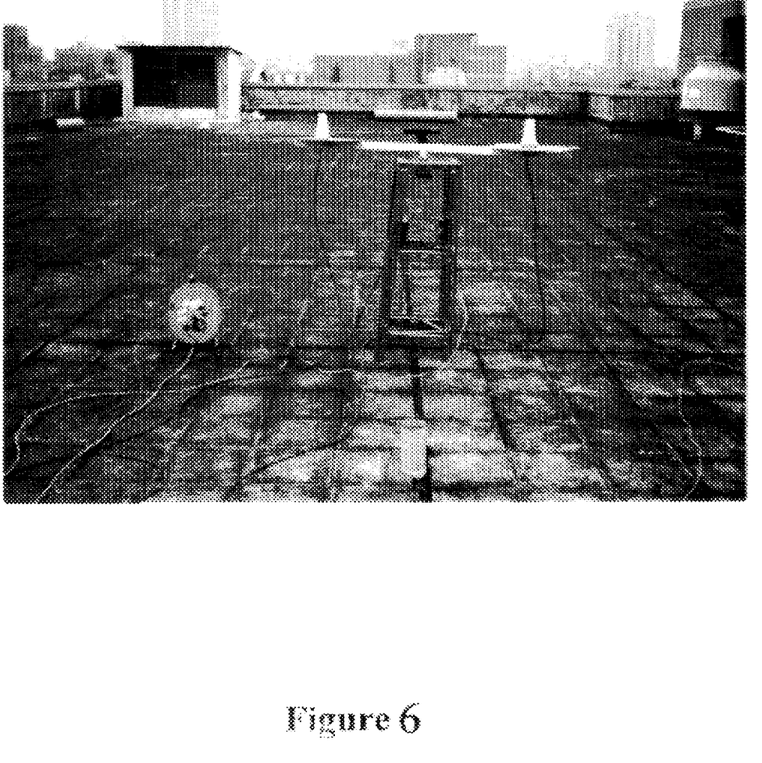
FIG. 6 is a appearance of the global positioning system compass
Figure 7:
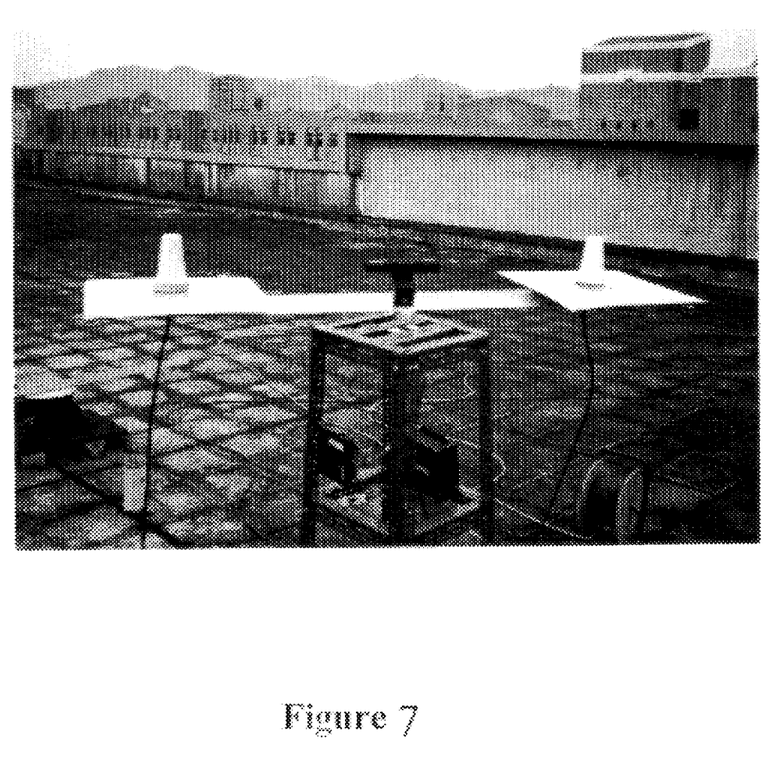
FIG. 7 is a appearance of the global positioning system compass

As shown in FIG. 6 and 7, the pointer unit of the global positioning system compass is a simple mechanical structure with the iron supporting frame. The aluminum bar as shown in the figure is the baseline, and the purpose of the aluminum plates is to eliminate the multipath of satellite signals.

The precision of a traditional compass is about five degrees. And its precision may be affected by the strength of the magnetic field incurred from the surrounding electrical instruments, metals, and iron mines. The gyroscope is less affected by the surrounding factors, however, it is an expensive device. Moreover, it needs a precise and complicate calibration process, and the measurement may be drifted in long term use, resulting in poor accuracy. The price of a global positioning system compass is between a regularly compass and a gyroscope. In an open area, the global positioning system compass performs its functions well enough to get a precision within one degree of direction. No drift occurs, and it is free of the disturbance from surrounding magnetic fields.

The time required for the initial mode to finish its operation is about one to two minutes. The system then goes to the normal mode subsequently, and points to the right direction in real time. With the advance of technologies in global positioning system receivers and personal computers, the prices of these equipments are expected to go down. The broad applications and the economic reasons make the present invention becoming a potential alternative device for traditional compasses.

What is claimed is:

1. A global positioning system compass, comprising:
a pointer unit,
a sensor unit, and
a controller unit, wherein the pointer unit includes a supporting frame, a metal bar supported by the supporting frame, and metal plates engaged with the metal bar and the sensor unit includes global positioning system antennas and global positioning system receivers.

2. The global positioning system compass defined by claim 1, wherein the controller unit includes a personal computer, at least one data interface circuit board, stepping motor and at least one controller circuit board, the stepping motor being supported by the supporting frame, a rotor axis of the motor being fixed with the metal bar, each of the metal plates being located on opposite ends of the metal bar, respectively, each global positioning system antenna being respectively attached to one of the metal plates, the global positioning system antennas being connected to the global positioning system receivers and to a personal computer via data interface circuit boards, the personal computer including means for determining the attitude and for controlling the motor via motor controlling circuit boards.

3. The global positioning system compass defined by claim 1, wherein the supporting frame is made of an iron frame, the metal bars and the metal plates are made of aluminum, and the controller unit includes a personal computer, data interface circuit boards, stepping motor, and motor controlling circuit boards.

4. The global position system as defined by claim 1, wherein the sensor unit includes global positioning system antennas and global positioning system receivers.

5. A global positioning system compass, comprising:

a pointer unit, a sensor unit, and a controller unit, wherein the pointer unit includes a supporting frame, a rigid bar, and metal plates.

* * * * *